United States Patent
Oh et al.

(10) Patent No.: US 11,874,856 B2
(45) Date of Patent: Jan. 16, 2024

(54) DATA CLASSIFICATION METHOD AND DEVICE FOR HIERARCHICAL MULTI-LABEL CLASSIFICATION

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Heung-Seon Oh, Cheonan-si (KR); Sang Hun Im, Cheonan-si (KR); Seong-Ung Jo, Pyeongtaek-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 17/927,549

(22) PCT Filed: Oct. 7, 2021

(86) PCT No.: PCT/KR2021/013812
§ 371 (c)(1),
(2) Date: Nov. 23, 2022

(87) PCT Pub. No.: WO2022/169060
PCT Pub. Date: Aug. 11, 2022

(65) Prior Publication Data
US 2023/0195756 A1 Jun. 22, 2023

(30) Foreign Application Priority Data
Feb. 5, 2021 (KR) .......................... 10-2021-0016809

(51) Int. Cl.
*G06F 16/00* (2019.01)
*G06F 16/28* (2019.01)
*G06F 18/241* (2023.01)

(52) U.S. Cl.
CPC .......... *G06F 16/285* (2019.01); *G06F 18/241* (2023.01)

(58) Field of Classification Search
CPC ..................................................... G06F 16/285
(Continued)

(56) References Cited

U.S. PATENT DOCUMENTS

| 8,504,570 | B2 * | 8/2013 | Hawkins .............. G06V 30/194 |
| | | | 707/752 |
| 2019/0057683 | A1 * | 2/2019 | Sak ......................... G10L 15/14 |
| | | | 707/707 |

(Continued)

FOREIGN PATENT DOCUMENTS

| JP | 08-153121 A | 6/1996 |
| KR | 10-2002-0042939 A | 6/2002 |

(Continued)

OTHER PUBLICATIONS

Youngsun Park "Classification and analysis of the structure of data with multiple hierarcies", Department of Computer Science & Engineering Ewha Institute of Science and Technology, Jan. 2004, pp. 1-57.

(Continued)

*Primary Examiner* — Alexandria Y Bromell
(74) *Attorney, Agent, or Firm* — Sughrue Mion, PLLC

(57) ABSTRACT

A data classification method and a device thereof for hierarchical multi-label classification are proposed. The data classification device includes an encoder configured to vectorize data, a decoder configured to receive the vectorized data from the encoder, and classification data stored in the (Continued)

decoder, wherein the decoder starts classification of the vectorized data on the basis of a first node in the classification data, allocates a plurality of nodes included in the classification data to the vectorized data, and forms partial layers based on the allocated nodes with respect to the vectorized data, and when terminal nodes or temporary nodes are allocated among the nodes, the decoder ends the allocation to the partial layers to which the terminal nodes or the temporary nodes are allocated and allocates final partial layers formed on the basis of the partial layers to the data.

14 Claims, 4 Drawing Sheets

(58) Field of Classification Search
USPC .......................................................... 707/737
See application file for complete search history.

(56) References Cited

U.S. PATENT DOCUMENTS

| 2020/0090045 | A1* | 3/2020 | Baker | G06N 3/006 |
| | | | | 707/707 |
| 2021/0329029 | A1* | 10/2021 | Vasseur | H04L 43/065 |
| | | | | 707/707 |

FOREIGN PATENT DOCUMENTS

| KR | 10-2019-0123372 A | 11/2019 |
| KR | 10-2019-0135129 A | 12/2019 |
| KR | 10-2277643 A | 7/2021 |

OTHER PUBLICATIONS

Written Opinion for PCT/KR2021/013812, dated Jan. 7, 2022.
International Search Report for PCT/KR2021/013812, dated Jan. 7, 2022.

* cited by examiner

DATA CLASSIFICATION METHOD AND DEVICE FOR HIERARCHICAL MULTI-LABEL CLASSIFICATION

TECHNICAL FIELD

Various exemplary embodiments of the present disclosure relate to a data classification method and a data classification device for hierarchical data classification.

BACKGROUND ART

Recently, a lot of research is in progress to automate data classification by using various learning methods such as machine learning and deep learning. In particular, research on automatic classification of a case where classification data used for classification has a hierarchical structure and multi-classification of a case where multiple classifications are allocated to one piece of data is ongoing.

For example, when data classification includes a hierarchical structure, data is represented as vectors for such data, and hierarchical classification is performed by using classification data and the data represented as the vectors.

In addition to such research, technology for machine summary and machine translation or machine generation, which use an encoder-decoder structure is being actively researched.

For example, in the case of the machine translation, in order to translate a specific language into another language, data of the specific language is represented as vectors through an encoder structure and specific language data represented as the vectors is translated into a target language through a decoder.

DISCLOSURE

Technical Problem

Conventionally, methods of classifying data having a hierarchical structure may include two types of methods.

The first method is a method of classifying data by assuming that a flat classification system exists, ignoring the hierarchical structure of the data classification. When such a method is used, the classification may be performed by using a single classification algorithm, but there may be limitations in taking into account the hierarchical structure of the data classification.

The second method is a method of classifying data by using a separate classification algorithm for each layer in a hierarchical structure of data classification. When such a method is used, the hierarchical structure of the data classification may be considered, but a plurality of classification algorithms or devices are required, so consumption of both data and time may be relatively increased to perform the classification.

Accordingly, through a classification method utilizing partial layers, hierarchical multi-label classification may be performed by using a single algorithm while considering a hierarchical structure of data classification.

Technical Solution

According to various exemplary embodiments of the present disclosure, there is provided a data classification device including: an encoder configured to vectorize data; a decoder configured to receive the vectorized data from the encoder; and classification data stored in the decoder, wherein the decoder starts classification of the vectorized data on the basis of a first node in the classification data, allocates a plurality of nodes included in the classification data to the vectorized data, and forms partial layers based on the allocated nodes with respect to the vectorized data, and when terminal nodes or temporary nodes are allocated among the nodes, the decoder ends the allocation to the partial layers to which the terminal nodes or the temporary nodes are allocated and allocates final partial layers formed on the basis of the partial layers to the data.

According to various exemplary embodiments of the present disclosure, there is provided a data classification method including: vectorizing data into vector data; starting classification of the vector data on the basis of a first node in pre-stored classification data; forming partial layers by allocating nodes included in the classification data to the vector data; ending the classification when terminal nodes among the nodes are allocated while the forming of the partial layers is performed; and allocating final partial layers formed by the classification to the data.

Advantageous Effects

The present disclosure relates to a method and device for classifying data having a hierarchical classification structure through a single algorithm included in an encoder and a decoder.

An embodiment of the present disclosure is configured to classify the data having the hierarchical classification structure through the single algorithm, thereby saving time and cost, which is spent for the data classification.

In addition, the embodiment of the present disclosure is configured to classify the data having the hierarchical classification structure by using partial layers, thereby performing the classification to clarify the hierarchical structure in the classification of the data having the multi-layer structure.

The effects that may be obtained in various exemplary embodiments of the present disclosure are not limited to the above-mentioned effects, and other different effects that are not mentioned will be clearly understood by those skilled in the art from the following description.

MODE FOR INVENTION

Figure 1:
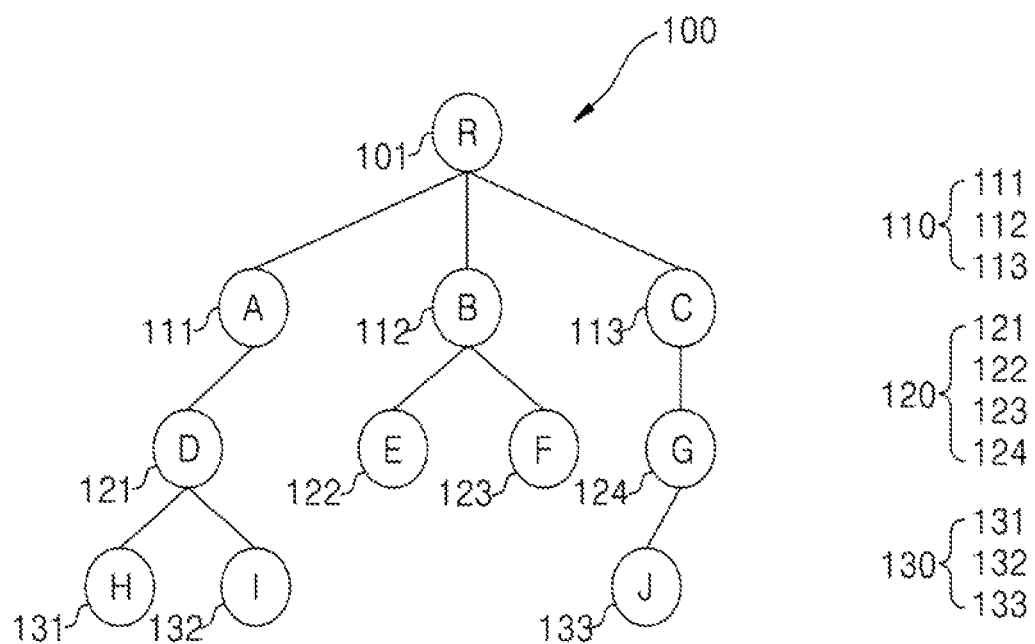
FIG. 1 is a view illustrating classification data for data classification.

Advantages and features of the exemplary embodiments of the present disclosure and the methods of achieving the same will become apparent with reference to the exemplary embodiments described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

In the following descriptions of the exemplary embodiments of the present disclosure, it is to be noted that, when a detailed description of a known function or configuration may unnecessarily obscure the subject matter of the present disclosure, the detailed description thereof will be omitted. In addition, terms to be described later are terms defined in consideration of functions in the exemplary embodiments of the present disclosure, which may vary according to the intention or custom of users or operators. Therefore, definitions of these terms should be made on the basis of the content throughout the present specification.

Hereinafter, exemplary embodiments of the present disclosure will be described in detail with reference to the accompanying drawings.

FIG. 1 is a view illustrating classification data for data classification.

Referring to FIG. 1, the classification data 100 for the data classification may include various nodes (e.g., a first node 101, and terminal nodes 131, 132, and 133) according to each layer.

According to the exemplary embodiment, the classification data 100 may include the first node 101 (or a root node) for starting classification. According to the exemplary embodiment, as the first node 101 is allocated to the data, the classification of the data may be started.

According to the exemplary embodiment, the classification data 100 may include first layer nodes 110 as lower nodes (or child nodes) of the first node 101. According to the exemplary embodiment, the first layer nodes 110 may include a 1-1 th node 111, a 1-2 th node 112, and a 1-3 th node 113, respectively. According to the exemplary embodiment, the first node 101 may be referred to as a higher node (or a parent node) with respect to the first layer nodes 110.

According to the exemplary embodiment, the classification data 100 may include second layer nodes 120 as lower nodes (or child nodes) of the first layer nodes 110. According to the exemplary embodiment, the second layer nodes 120 may include a 2-1 th node 121, a 2-2 th node 122, a 2-3 th node 123, and a 2-4 th node 124, respectively. According to the exemplary embodiment, the first layer nodes 110 may be referred to as higher nodes (or parent nodes) with respect to the second layer nodes 120.

According to the exemplary embodiment, the classification data 100 may include third layer nodes 130 as lower nodes (or child nodes) with respect to the second layer nodes 120. According to the exemplary embodiment, the third layer nodes 130 may include a 3-1 th node 131, a 3-2 th node 132, and a 3-3 th node 133, respectively. According to the exemplary embodiment, the second layer nodes 120 may be referred to as higher nodes (or parent nodes) with respect to the third layer nodes 130.

According to the exemplary embodiment, the third layer nodes 130 may be referred to as terminal nodes. According to the exemplary embodiment, when the third layer nodes 130 (or the terminal nodes) are allocated to the data, the classification may be ended. A detailed description thereof will be given later.

However, the layers of the classification data 100 are not limited to the above-described components (e.g., the first layer nodes 110, the second layer nodes 120, and the third layer nodes 130), but may include various layers. According to another exemplary embodiment (not shown), some of the above-described components (e.g., the second layer nodes 120) may be omitted. According to a yet another exemplary embodiment (not shown), fourth layer nodes (not shown) may be added as lower nodes with respect to the third layer nodes 130, and the fourth layer nodes may be referred to as terminal nodes.

Figure 2:
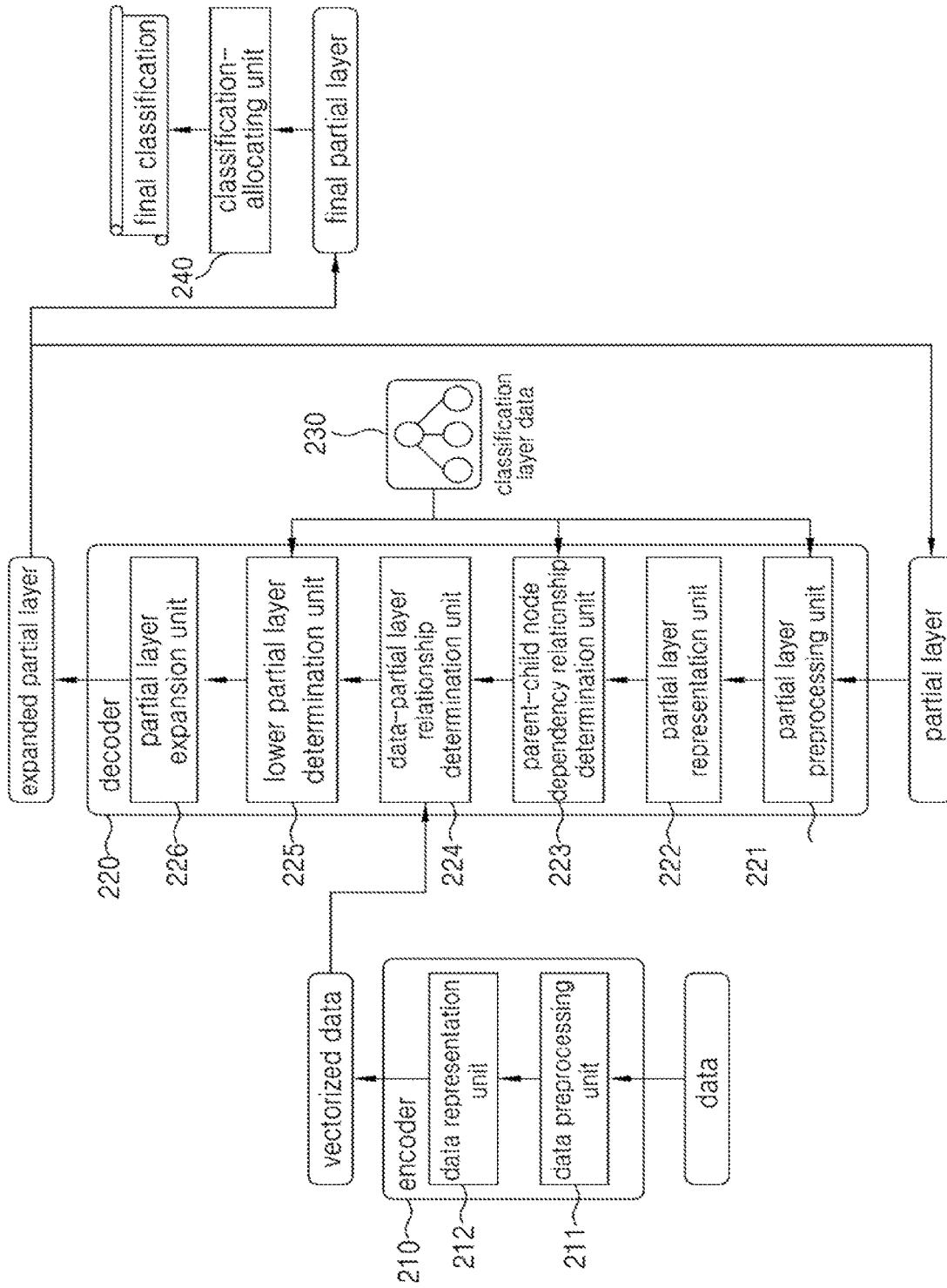
FIG. 2 is a view illustrating a configuration and operation of a data classification device according to an exemplary embodiment.

FIG. 2 is a view illustrating a configuration and operation of a data classification device according to the exemplary embodiment.

Referring to FIG. 2, the data classification device 200 according to the exemplary embodiment may include an encoder 210 and a decoder 220. According to the exemplary embodiment, the data classification device 200 may use the encoder 210 and the decoder 220 to allocate the classification of data.

According to the exemplary embodiment, the encoder 210 may vectorize data. According to the exemplary embodiment, the data preprocessing unit 211 included in the encoder 210 may perform preprocessing for vectorizing the received data. For example, the preprocessing of the data may include correcting or processing the data, but is not limited thereto. According to the exemplary embodiment, a data representation unit 212 included in the encoder 210 may convert the preprocessed data into a vector representation.

According to the exemplary embodiment, the encoder 210 may transmit the vectorized data to the decoder 220. According to the exemplary embodiment, the decoder 220 may receive the vectorized data from the encoder 210. According to the exemplary embodiment, the decoder 220 may receive a pre-generated partial layer from the data classification device 200.

According to the exemplary embodiment, the decoder 220 may include a partial layer preprocessing unit 221, a partial layer representation unit 222, a parent-child node dependency relationship determination unit 223, a data-partial layer relationship determination unit 224, a lower partial layer determination unit 225, and a partial layer expansion unit 226. However, some of the components of the decoder 220 (e.g., the parent-child node dependency relationship determination unit 223) may be omitted or may be formed integrally with other components (e.g., the partial layer preprocessing unit 221), and the components of the decoder 220 are not limited to the components described above.

According to the exemplary embodiment, through partial layer preprocessing unit 221, the decoder 220 may define dependency relationships (e.g., parent-child nodes, and upper-lower nodes) between nodes of the classification data 230 (e.g., the classification data 100 of FIG. 1). According to the exemplary embodiment, the partial layer preprocessing unit 221 may preprocess a partial layer in order to vectorize the partial layer.

According to the exemplary embodiment, through the partial layer representation unit 222, the decoder 220 may vectorize the classification data 230 in which the nodes are defined and the partial layers included. For example, in the partial layer representation unit 222, the partial layers and the classification data 230, in which the nodes are defined by the partial layer preprocessing unit 221, may be converted into a vector representation.

According to the exemplary embodiment, the parent-child node dependency relationship determination unit 223 may define terminal nodes of partial layers (e.g., the third layer nodes 130 of FIG. 1) on the basis of the dependency relationships between the nodes defined in the partial layer preprocessing unit 221. According to the exemplary embodiment, the data-partial layer relationship determination unit 224 may define relationships between the terminal nodes defined in the parent-child node dependency relationship determination unit 223 and the vectorized data received from the encoder 210. According to the exemplary embodiment, the data-partial layer relationship determination unit 224 may redefine the terminal nodes on the basis of the vectorized data received from the encoder 210.

According to the exemplary embodiment, the lower partial layer determination unit 225 may determine lower nodes (or child nodes) to be further expanded on the basis of the vectorized data and the terminal nodes. According to the exemplary embodiment, the partial layer expansion unit 226 may add the lower nodes (or the child nodes) determined by the lower partial layer determination unit 225 to a received partial layer. According to the exemplary embodiment, the partial layer expansion unit 226 may expand the partial layer by adding the lower nodes determined by the lower partial layer determination unit 225 to the previously received partial layer.

According to the exemplary embodiment, the decoder 220 may repeat the above-described process for the decoder 220 for the expanded partial layer when there are lower nodes that may be expanded with respect to the expanded partial layer. A detailed description thereof will be given later.

According to the exemplary embodiment, the decoder 220 may transmit the expanded partial layer to a classification-allocating unit 240 as a final partial layer when a terminal node that may not be further expanded is allocated to the expanded partial layer. According to the exemplary embodiment, the classification-allocating unit 240 may allocate the received final partial layer to the data.

Figure 3:
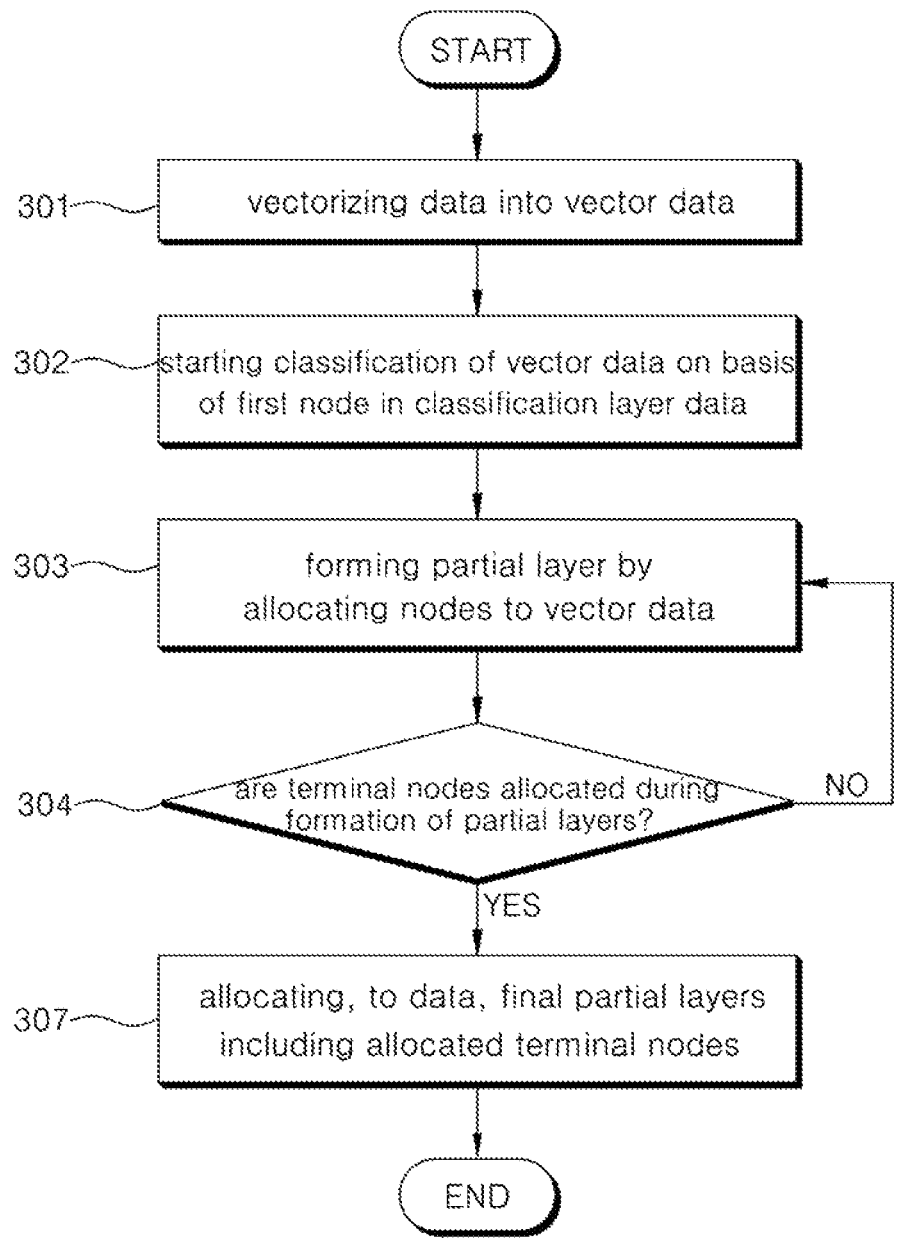
FIG. 3 is a flowchart illustrating a data classification method according to the exemplary embodiment.

FIG. 3 is a flowchart illustrating a data classification method according to the exemplary embodiment.

Referring to FIGS. 1, 2, and 3 together, the data classification device 200 may receive data, and may generate and allocate partial layers to the data.

According to the exemplary embodiment, in operation 301, an encoder 210 may receive data and vectorize the received data into vector data. According to the exemplary embodiment, in operation 302, the decoder 220 may start classifying the received vector data on the basis of classification data 230. For example, as a first node 101 in the classification data 230 is allocated, the decoder 220 may start the classifying of the vector data.

The classification of the vector data according to the exemplary embodiment may be performed on the basis of the classification data 230 previously stored in the decoder 220.

According to the exemplary embodiment, in operation 303, the decoder 220 may form a partial layer by allocating nodes to a pre-stored partial layer. According to another exemplary embodiment, in operation 303, the decoder 220 may generate a partial layer on the basis of nodes. For example, the decoder 220 may form a partial layer by allocating a 1-1 th node 111, a 2-1 th node 121, and a 3-2 th node 132 to vector data. As another example, the decoder 220 may form a partial layer by allocating a 1-2 th node 112 and a 2-3 th node 123 to vector data. In addition, the decoder 220 may simultaneously form a plurality of partial layers as in the above-described examples.

According to the exemplary embodiment, in operation 304, the decoder 220 may determine whether a terminal node is allocated to a partial layer or not. For example, during the forming of the partial layer through operation 303, the decoder 220 may determine whether the terminal node (e.g., the 3-1 th node 131 of FIG. 1) is allocated to the partial layer in operation 304. According to the exemplary embodiment, when it is determined that the terminal node is not allocated to the partial layer in operation 304, the decoder 220 may form a partial layer by repeatedly performing operations 303 and 304.

According to the exemplary embodiment, in operation 307, when it is determined that the terminal node is allocated to the partial layer, the decoder 220 may allocate a final partial layer including the terminal node allocated to the partial layer to the data. For example, the decoder 220 may generate final partial layers each including the terminal nodes (e.g., the 3-1 th node 131, and the 2-3 th node 123) allocated to the respective partial layers, and may allocate the generated final partial layers to the data.

According to the exemplary embodiment, the decoder 220 or the classification data 230 may include a terminal node or a temporary node for determining whether to end partial layer formation. For example, in order to allocate, as a final partial layer, the 1-3 th node 113 including the 2-4 th node 124 and the 3-3 th node 133 as lower nodes thereof, a temporary node as a lower node may be included in the 1-3 th node 113. For example, when the temporary node is allocated as the lower node of the 1-3 node 113, the final partial layer including the 1-3 node 113 as a terminal node may be generated. However, the above-described temporary node may be omitted, and according to another exemplary embodiment, temporary nodes may be generated for the first node 101 and other nodes as well.

Figure 4:
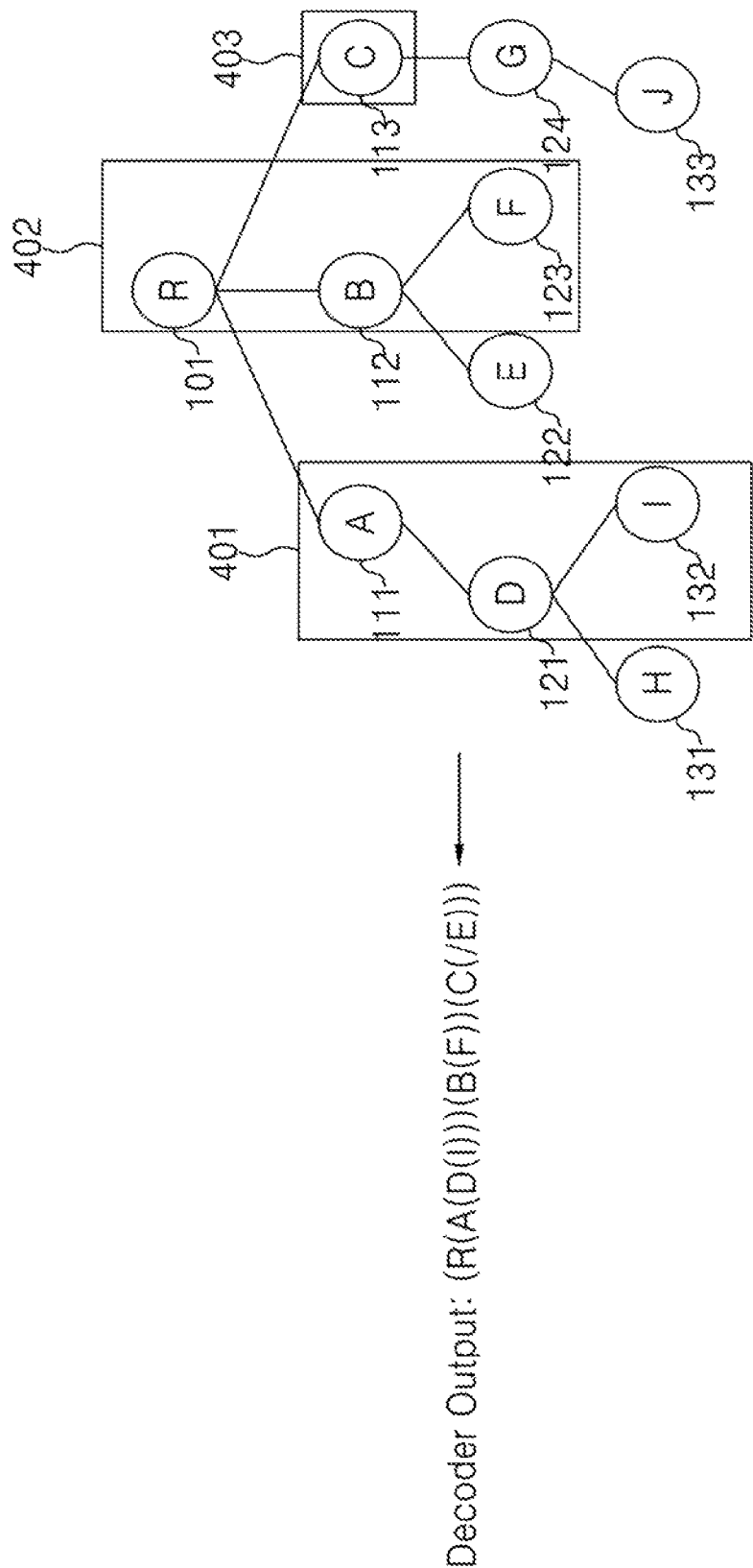
FIG. 4 is a view illustrating an output generated through FIGS. 2 and 3.

FIG. 4 is a view illustrating an output generated through FIGS. 2 and 3.

Referring to FIGS. 1, 2, 3, and 4 together, the decoder 220 according to the exemplary embodiment may obtain a classification result by forming partial layers 401, 402, and 403.

According to the exemplary embodiment, the decoder 220 may form a first partial layer 401, a second partial layer 402, and a third partial layer 403 through the process of FIG. 3. According to the exemplary embodiment, the decoder 220 may form the first partial layer 401, the second partial layer 402, and the third partial layer 403 together. According to the exemplary embodiment, the decoder 220 may form the first partial layer 401, the second partial layer 402, and the third partial layer 403 through a single algorithm. However, some of the above-described partial layers (e.g., the third partial layer 403) may be omitted, and another partial layer may be added.

According to the exemplary embodiment, the decoder 220 may obtain vectorized final partial layers from the first partial layer 401, second partial layer 402, and third partial layer 403. According to the exemplary embodiment, the decoder 220 may obtain the classification result (or the final partial layers) including the respective terminal nodes 132, 123, 113 of the first partial layer 401, second partial layer 402, and third partial layer 403.

The data classification device according to the exemplary embodiment includes: an encoder configured to vectorize data; a decoder configured to receive the vectorized data from the encoder; and classification data stored in the decoder, wherein the decoder may start classification of the vectorized data on the basis of a first node among the classification data, allocate a plurality of nodes included in the classification data to the vectorized data, and form partial layers based on the allocated nodes with respect to the vectorized data, and when terminal nodes or temporary nodes are allocated among the nodes, the decoder may end the allocation to the partial layers to which the terminal nodes or the temporary nodes are allocated and allocate final partial layers formed on the basis of the partial layers to the data.

According to the exemplary embodiment, the encoder may include: a data preprocessing unit configured to preprocess data; and a data representation unit configured to convert the preprocessed data into a vector representation.

The decoder according to the exemplary embodiment may include: a partial layer preprocessing unit configured to define dependency relationships of the nodes on the basis of the classification data; a partial layer representation unit configured to convert the nodes into the vector representation; and a data-partial layer relationship determination unit configured to identify relationships between the vectorized data and the nodes each represented as a vector.

According to the exemplary embodiment, the data classification device may include a partial layer expansion unit configured to expand the partial layer for the vectorized data on the basis of the defined dependency relationships.

The classification data according to the exemplary embodiment may include a temporary node for determining whether to end the classification based on the first node.

According to the exemplary embodiment, the final partial layers may include data of nodes corresponding to the respective terminal nodes in the formed partial layers.

According to the exemplary embodiment, the data classification device may include a memory, and the decoder may store, in the memory, the data to which the final partial layers are allocated.

The data classification method according to the exemplary embodiment may include: vectorizing data into vector data; starting classification of the vector data on the basis of a first node in pre-stored classification data; forming partial layers by allocating nodes included in the classification data to the vector data; ending the classification when terminal nodes among the nodes are allocated while the forming of the partial layers is performed; and allocating final partial layers formed by the classification to the data.

According to the exemplary embodiment, in the data classification method, the vectorizing of the data into the vector data may include preprocessing the data and converting the preprocessed data into a vector representation.

According to the exemplary embodiment, the forming of the partial layers may include allocating lower nodes on the basis of upper nodes among the nodes.

According to the exemplary embodiment, the starting of the classification of the vector data on the basis of the first node may include allocating the temporary node to determine whether the classification based on the first node is ended or not.

According to the exemplary embodiment, the data classification method may include: defining the dependency relationships among the nodes included in the classification data; and converting the nodes into the vector representation.

According to the exemplary embodiment, the final partial layer may include the data of the nodes corresponding to the terminal node in the formed partial layer.

According to the exemplary embodiment, the data classification method may include storing, in the memory, the data to which the final partial layers are allocated.

The invention claimed is:

1. A data classification device comprising:
an encoder configured to vectorize data;
a decoder configured to receive the vectorized data from the encoder; and
classification data stored in the decoder,
wherein the decoder is further configured to:
start classification of the vectorized data based on a first node from among a plurality of nodes in the classification data;
preprocess a pre-generated partial layer by defining dependency relationships of the plurality of nodes based on the classification data;
allocate the plurality of nodes in the classification data to the vectorized data;
form partial layers based on the allocated plurality of nodes with respect to the vectorized data;
when terminal nodes or temporary nodes are allocated among the plurality of nodes, end allocation to the partial layers to which the terminal nodes or the temporary nodes have been allocated; and
allocate final partial layers formed from the partial layers to the vectorized data.

2. The data classification device of claim 1, wherein the encoder comprises:
a data preprocessing unit configured to preprocess the data; and
a data representation unit configured to convert the preprocessed data into a vector representation.

3. The data classification device of claim 1, wherein the decoder comprises:
a partial layer preprocessing unit configured to define the dependency relationships of the plurality of nodes based on the classification data;
a partial layer representation unit configured to convert the plurality of nodes into a vector representation; and
a data-partial layer relationship determination unit configured to identify relationships between the vectorized data and the plurality of nodes, each relationship of the identified relationships being represented as a vector.

4. The data classification device of claim 3, wherein the decoder further comprises:
a partial layer expansion unit configured to expand the partial layers for the vectorized data based on the dependency relationships.

5. The data classification device of claim 1, wherein the decoder is further configured to:
determine whether the classification of the vectorized data has completed based on the terminal nodes and the temporary nodes.

6. The data classification device of claim 1, wherein the final partial layers comprise data of nodes corresponding to the terminal nodes in the partial layers.

7. The data classification device of claim 1, further comprising:
a memory,
wherein the decoder is further configured to store, in the memory, data to which the final partial layers are allocated.

8. A data classification method comprising:
vectorizing data into vector data;
starting classification of the vector data based on a first node from among a plurality of nodes in pre-stored classification data;
preprocessing a pre-generated partial layer by defining dependency relationships of the plurality of nodes based on the pre-stored classification data;
forming partial layers by allocating the plurality of nodes in the pre-stored classification data to the vector data;
ending the classification of the vector data when terminal nodes among the plurality of nodes are allocated while the forming of the partial layers is performed; and
allocating final partial layers formed by the classification to the vector data.

9. The data classification method of claim 8, wherein the vectorizing of the data into the vector data comprises:
   preprocessing the data; and
   converting the preprocessed data into a vector representation.

10. The data classification method of claim 8, wherein the forming of the partial layers comprises:
    allocating lower nodes based on upper nodes among the plurality of nodes.

11. The data classification method of claim 8, wherein the starting of the classification of the vector data comprises:
    allocating temporary nodes to the vector data; and
    determining whether to end the classification based on the temporary nodes.

12. The data classification method of claim 8, further comprising:
    converting the plurality of nodes into a vector representation.

13. The data classification method of claim 8, wherein the final partial layers comprises data of nodes corresponding to the terminal nodes in the formed partial layers.

14. The data classification method of claim 8, further comprising:
    storing, in a memory, data to which the final partial layers are allocated.

* * * * *